(12) United States Patent
Gremmelmaier et al.

(10) Patent No.: US 9,133,888 B2
(45) Date of Patent: Sep. 15, 2015

(54) COUNTER TRACK JOINT

(75) Inventors: Anna Gremmelmaier, Sankt Augustin (DE); Ida Hassenrik, Troisdorf (DE); Hans-Jürgen Post, Bonn (DE); Thomas Weckerling, Sankt Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 14/241,618

(22) PCT Filed: Aug. 29, 2011

(86) PCT No.: PCT/EP2011/064845
§ 371 (c)(1),
(2), (4) Date: Feb. 27, 2014

(87) PCT Pub. No.: WO2013/029655
PCT Pub. Date: Mar. 7, 2013

(65) Prior Publication Data
US 2014/0206463 A1   Jul. 24, 2014

(51) Int. Cl.
*F16D 3/223* (2011.01)
*F16D 3/24* (2006.01)

(52) U.S. Cl.
CPC *F16D 3/24* (2013.01); *F16D 3/223* (2013.01); *F16D 2003/22306* (2013.01); *F16D 2003/22309* (2013.01)

(58) Field of Classification Search
CPC ............ F16D 2003/22306; F16D 2003/22309; Y10S 464/906
USPC .......................................... 464/144–146, 906
See application file for complete search history.

(56) References Cited

U.S. PATENT DOCUMENTS 3,475,924 A * 11/1969 Aucktor ................... 464/145 X
7,632,189 B2 * 12/2009 Schwarzler et al. .......... 464/145
2007/0111806 A1   5/2007 Weckerling
(Continued)

FOREIGN PATENT DOCUMENTS

DE   102004006225 A1   3/2005
DE   102005042910 A1   3/2007
(Continued)

OTHER PUBLICATIONS

Informal Comments dtd Jun. 4, 2012 filed by applicant Feb. 27, 2014.*

*Primary Examiner* — Gregory Binda
(74) *Attorney, Agent, or Firm* — Bejin Bieneman PLC

(57) ABSTRACT

A counter track joint includes an outer joint part with first and second outer ball tracks, an inner joint part with first and second inner ball tracks. The first outer and inner ball tracks, together, form first pairs of tracks, which, when the joint is in an aligned position, widen towards the aperture end of the outer joint part and each accommodate first torque transmitting balls. The second outer and inner ball tracks, together, form second pairs of tracks which, when the joint is in the aligned position, widen towards the attaching end of the outer joint part and which each accommodate second torque transmitting balls. The centers of the balls of the first pairs of tracks each define a first track center line. The first track center line, in the direction from the central joint plane towards the attaching end extends radially inside a first reference arc.

19 Claims, 11 Drawing Sheets

(56) References Cited

U.S. PATENT DOCUMENTS

2010/0113167 A1 5/2010 Weckerling et al.
2010/0323802 A1 12/2010 Weckerling et al.

FOREIGN PATENT DOCUMENTS

EP 1656509 5/2006
FR 2847316 A1 5/2004

* cited by examiner

COUNTER TRACK JOINT

CROSS-REFERENCE TO RELATED APPLICATION

This application is a National Stage application which claims the benefit of International Application No. PCT/EP2011/064845 filed Aug. 29, 2011, which is hereby incorporated by reference in its entirety.

BACKGROUND

A constant velocity joint can be in the form of a counter track joint. Counter track joints comprise an even number of pairs of tracks. The first half of said pairs of tracks opens towards the aperture end of the outer joint part and the other half of said pairs of tracks opens towards the attaching end of the outer joint part. The pairs of tracks of the first and of the second type are arranged so as to alternate in the circumferential direction. The number of the pairs of tracks is an even number, more particularly amounts to 6, 8 or 10.

US 2007/01 1 1806 A1, corresponding to WO 2006/048032 A1, proposes a counter track joint of said type. The ball tracks—which in the central joint plane of an aligned joint, open towards the attaching end—at the attaching end, comprise a first arched portion with a small radius; in the region of the central joint plane, they comprise a second arched portion with a greater radius; and at the aperture end, they comprise a third arched portion which, relative to the second arched portion, comprises an opposed direction of curvature. The ball tracks which, in the central joint plane of the aligned joint, widen towards the aperture end, according to a first embodiment, comprise the same radius along the entire length of the ball tracks; or according to a second embodiment, they comprise an arched portion which, with a uniform radius, extends from the attaching end beyond the central joint plane and which, at the aperture end, is adjoined by a counter radius or, according to a third embodiment, they comprise an arched portion which, with the same radius, extends from the attaching end beyond the central joint plane and which, at the aperture end, is adjoined by a tangent.

From EP 1 656 509 B1, corresponding to WO 2005/028895 A1, there is known a counter track joint wherein it is proposed that the ball tracks which, in an aligned joint, in the central joint plane, extend from the aperture end to the attaching end, extend in an S-shaped way, wherein the centre line of said ball tracks in the outer joint part, towards the attaching end, deviates from a reference radius radially inwardly, and, towards the aperture end, deviates from said reference radius radially outwardly. As a result of said track shape of the ball tracks opening in an aligned joint in the central joint plane towards the attaching end, there is achieved an increase in the maximum articulation angle. The ball tracks which, in an aligned joint in the central joint plane, widen from the attaching end towards the aperture end, comprise a circular arch with a uniform radius from the attaching end to the central joint plane, which circular arch, at the aperture end, is adjoined by a tangent.

US 2010/0323802 A1, corresponding to WO 2008/080709, proposes a further counter track joint. The ball tracks opening in an aligned joint in the central joint plane from the aperture end to the attaching end extend in an S-shaped way. The ball tracks which widen in an aligned joint in the central joint plane from the attaching end to the aperture end extend in an S-shaped way and are composed of a rear arched portion with a large radius; in the region of the central joint plane, they comprise a central arched portion with a smaller radius as well as an arched portion at the aperture end, which arched portion, relative to the central arched portion, extends in the opposed direction of curvature. The ball cage comprises an outer spherical face with an internally spherical centre, wherein the externally spherical centre and the internally spherical centre are arranged so as to be offset relative to one another. As a result of this counter track joint design there is achieved a thicker cage diameter which leads to a greater strength and to deeper track run-outs at the attaching end, which, in turn, leads to a longer service life.

In the above-mentioned counter track joints, the ball tracks which, in an aligned condition of the counter track joint, open in the central joint plane towards the attaching end are curved radially inwards. Thus, the wrap angles of the ball tracks around the balls in the inner joint part and in the outer joint part are more aligned to one another and thereby enhanced.

In particular, in the case of counter track joints with six balls, it is difficult to achieve a reliable cage control combined with a low-noise characteristic because when the joint is in operation, only a total of three balls act on the cage in one direction, only some of which, under articulated conditions, provide a control function relative to the cage.

SUMMARY

It is therefore the object of the present disclosure to propose a counter track joint which, while having the same service life, ensures improved cage control conditions and a low noise level in operation.

The objective is achieved by providing a constant velocity joint in the form of a counter track joint comprising an outer joint part which comprises a longitudinal axis L12 and an attaching end and an aperture end which are axially opposed relative to one another, and which also comprises first outer ball tracks and second outer ball tracks;

an inner joint part which comprises a longitudinal axis L13 and an attaching portion for a shaft which points to the aperture end of the outer joint part, and which inner joint part also comprises first inner ball tracks and second inner ball tracks, wherein the first outer ball tracks and the first inner ball tracks form first pairs of tracks which, in an aligned condition of the counter track joint, widen towards the aperture end of the outer joint part; and wherein the second outer ball tracks and the second inner ball tracks form second pairs of tracks which, in the aligned condition of the counter track joint, widen towards the attaching end of the outer joint part;

a torque transmitting ball in each first pair of tracks and in each second pair of tracks; an annular ball cage which is arranged between the outer joint part and the inner joint part and comprises circumferentially distributed cage windows which each accommodate at least one of the torque transmitting balls;

wherein, with coaxially aligned longitudinal axes L12, L13 of the inner joint part and of the outer joint part, the balls are held by the ball cage on a central joint plane EM and, in the case of an angular movement of the inner joint part relative to the outer joint part, are guided onto an angle-bisecting plane between the longitudinal axes L12, L13;

wherein the centres of the balls of the first ball tracks, when said balls are moved along the outer and inner first ball tracks, define a first track centre line A, wherein the centres of the balls of the second ball tracks, when said balls are moved along the outer and inner second ball tracks, define a second track centre line B;

wherein a first reference radius RRA is defined between a radius centre MRA of the longitudinal axis L12 of the outer joint part 12 and a central plane intersection point PEA of the first track centre line A and the central joint plane EM, wherein the radius centre MRA is positioned in the point of intersection of the longitudinal axis L12 and a line which runs through said central plane intersection point PEA and which is perpendicular to a tangent on the first track centre line A in the central joint plane EM; and wherein, in the direction from the central joint plane EM towards the attaching end, at least a portion of the first track centre line A extends radially inside a reference arch CRA defined by said first reference radius RRA.

Because the first track centre line extends towards the attaching end inside the reference radius, improved cage control conditions are achieved at large articulation angles. This is due to the fact that, in the rear portion, the introduction of force from the first pairs of tracks to the balls and from the latter to the ball cage is improved. As a result, the forces acting on the ball cage are particularly well balanced. Overall, there is thus provided a joint with which it is possible to achieve particularly large articulation angles, and because of the improved cage control conditions, there is little noise, vibration and harshness (NVH). In contrast to the counter track joints known from the state of the art, the rear track portion of the ball tracks which, when the joint is in an aligned condition, open towards the aperture end (track centre line A), are curved radially inside towards the attaching end. Thus, in the outer joint part, the wrap angles of said ball tracks (track centre line A) around the balls guided therein are reduced.

Above, the track shape of the first track centre line A is described with reference to the outer joint part. However, it is understood that the first track centre line A' of the inner joint part is designed accordingly. The disclosure herein in connection with the first track centre line A or the second track centre line B of the outer joint part applies in the same form to the first track centre line A' and, respectively, to the second track centre line B' of the inner joint part, only mirror-symmetrically with reference to the central joint plane EM. In this connection, a concave portion of the track centre line of the outer joint part corresponds to a respective convex portion of the track centre line of the inner joint part, and vice versa.

In an example, the first track centre line A extends radially inside the reference arch CRA defined by the first reference radius RRA towards the attaching end starting from an angle of at least 8°, more particularly starting from an angle of at least 10° or 12°, with respect to the joint centre plane EM around the joint centre M. Up to said angle, which is enclosed between the joint centre plane EM and a line through the joint centre M and the centre of the ball, the first track centre line A has a relatively small curvature in its central portion. However, in a rear curved portion which is at least partially located radially inside the first reference arch defined by the first reference radius RRA, the curvature is stronger, compared with the curvature of the central portion. The mentioned angles between the centre of the ball and the joint centre plane, starting from which angles the track centre line A runs radially inside the reference radius, are preferred values. It is understood that the track centre line A can also run radially within the reference radius already in smaller angle regions with respect to the joint centre plane EM, such as starting from an angle of 3° for example.

According to an example, in the outer joint part, a rear portion A2 of the first track centre line A is designed such that a first tangent angle $\alpha 1$, which is enclosed between a first tangent T1 at the first track centre line A in a first rear track point P1 and the longitudinal axis L12 of the outer joint part, ranges between 28° and 38°, wherein the first track point P1 is defined by the point of intersection of the first track centre line A and a straight line through the joint centre M, which straight line encloses an angle of 15° with the central joint plane EM. Or, in other words, the first track point P1 is defined by the position of the ball centre which is assumed by the torque transmitting ball in the respective ball track when the inner joint part is articulated relative to the outer joint part by 30°.

Furthermore, in the outer joint part, the rear second portion A2 of the first track centre line A is preferably designed such that a second tangent angle $\alpha 2$, which is enclosed between a second tangent T2 at the first track centre line A in a second rear track point P2 and the longitudinal axis of the outer joint part, ranges between 36° and 46°, wherein the second track point P2 is designed by the point of intersection of the first track centre line A and a straight line through the joint centre M, which straight line encloses an angle of 20° with the central joint plane EM. Or, in other words, the second track point P2 is defined by the position of the ball centre when the inner joint part is articulated relative to the outer joint part by 40°.

As a result of said measures, there are achieved particularly large tangent angles $\alpha$ for the first track centre line A in the rear portion, which leads to particularly good cage control conditions and low noise levels.

The first track centre line A comprises a central curved portion A1 which, with reference to the central joint plane EM, extends over an angular range around the joint centre plane EM of at least 3°, more particularly of at least 4°, towards the aperture end on one side and the attaching end, on the other side. Within this angle range around the joint centre plane EM, the constant velocity joint is operated in service life operation. This means that, when the joint is operated within said angle range, the design service life of the joint is reached under changing load conditions, without the joint suffering any damage. Therefore, said angle range on both sides of the joint central plane can also be referred to as service life angle.

The central curved portion A1 can be designed in several ways. According to a first possibility, the central curved portion A1 of the first track centre line A is circular arch shaped, i.e. the central curved portion A1 is formed by a circular arch with a uniform first radius along its length around a first centre, wherein the curvature along the entire length of the central curved portion A1 is constant. The radius of the central curved portion A1 can have the same size as the reference radius, which means that the two said radii in said central portion A1 would coincide. However, the radius of the central portion A1 may be smaller or bigger than the reference radius, in which case the radius centre, relative to the longitudinal axis of the outer joint part, would be positioned at a radial distance. If the radius of the central portion A1 is smaller than the reference radius RRA, already within said central portion A1, the first track centre line A would deviate radially inwardly from the reference radius RRA towards the attaching end. If the radius of the central portion A1 is bigger than the reference radius RRA, the first track center line A, in the central portion A1, runs radially outside said reference radius RRA. In this case, the track center line A passes over the first reference arch CRA defined by the reference radius RRA towards the inside within the rear curved portion which adjoins the central curved portion, wherein the further course of the rear curved portion towards the attaching end is then radially inside the reference radius RRA.

According to a second possibility, the central curved portion A1 of the first track centre line A can be formed by a curve of a higher order, e.g. by an ellipse, a spiral or a hyperbola, instead of being formed by a circular arch with a uniform radius. In this case, the curvature of the central curved portion A1 would be increased towards the attaching end continuously, so that the first track centre line A in said portion moves away radially inwardly from the reference radius RRA. Curvature in this context refers to the change in direction of the respective track portion along the length of an infinitesimally short piece.

According to an example, the central curved portion A1 of the first track centre line A, towards the attaching end, is adjoined by a rear curved portion A2. According to a first possibility, the rear curved portion A2 of the first track centre line A comprises a circular arch with a uniform second radius RA2 along its length around a second centre MA2, which means that the curvature along the entire length of the rear portion A2 is constant. It is proposed that the second radius RA2 of the rear portion A2 is smaller than the radius R1 (in the case of a circular arch) or, respectively, smaller than a smallest radius (in the case of a curve of a higher order) of the central portion A1. The second radius RA2 of the second portion A2, in one example, amounts to 0.5 to 0.75 times the (smallest) first radius RA1 of the first portion A1. However, it is understood that, in another example, the rear portion A2 can also have a shape which deviates from a circular arch, for instance an elliptical, spiral or hyperbolic shape. The decisive factor is that the curved rear portion A2 extends at least partially, respectively in a rear part, radially inside the first reference radius RRA. Preferably, each tangent angle which is enclosed between a tangent at the rear portion A2 and the longitudinal axis of the outer joint part is smaller than a tangent angle which is enclosed between a tangent at the central portion A1 and the longitudinal axis of the outer joint part. Or, in other words, at any point along the rear portion A2, the curvature of the rear portion A2 is greater than the greatest curvature of the central portion A1.

In an example, in the outer joint part, the centre MA2 of the circular arch of the rear curved portion A2 comprises an axial offset towards the first track centre line A. Furthermore, it is proposed that said centre MA2 comprises an axial offset relative to the central joint plane EM, i.e. towards the aperture end.

According to an example, in the outer joint part, a first offset plane EA is defined towards the aperture end, which is positioned so as to extend parallel to the central joint plane EM and contains the centre MA1 of the central curved portion A1 of the first track centre line A, wherein the central curved portion A1 of the first track centre line A, starting from the offset plane EA, extends over a track angle γA1 which is greater than 16° towards the attaching end. Preferably, the track angle γA1 is smaller than 18°.

According to another example, on the first track centre line A between the central first portion A1 and the rear second portion A2, there is defined a transition point P12, wherein the circular arch of the second portion A2, starting from the transition point P12, extends over an angle γA2 greater than 20° towards the attaching end. Preferably, the angle γA2 is smaller than 27°.

According to another example, the first track centre line A, in the region adjoining the rear curved portion A2, comprises a rear straight portion A3 which tangentially adjoins the rear curved portion A2 towards the attaching end. Said straight portion A3 forms the run-out (at the attaching end) of the first track centre line A of the outer joint part.

Towards the aperture end, the first track centre line A of the outer joint part comprises a front portion which adjoins the central portion towards the aperture end. According to a first possibility, the front portion of the first track centre line A can be provided as a continuation of the central portion, i.e. with the same radius RA1. According to a second possibility, the front portion can extend radially outside the first reference radius. The front portion can be provided in the form of a circular arch whose direction of curvature is opposed to the circular arch of the central portion, or in the form of a tangent which tangentially adjoins the central portion A1.

According to an example, the ball cage comprises an inner spherical surface with an inner radius around a first surface centre and an outer spherical surface with an outer radius around a second surface centre, wherein the first surface centre and the second surface centre are arranged at an axial distance from one another. This configuration ensures that the ball wrap at the ball tracks at the attaching end is increased. More particularly, this is advantageous in respect of the cooperation with the first track centre lines A extending at the attaching end inside the first reference radius RRA because the cage offset, in this region, acts against the track depth which is reduced due to the reduced radius. Thus, overall, good cage control conditions are achieved in the first ball tracks which open towards the attaching end without having to accept any losses regarding the strength and service life of the joint.

In the outer joint part, a first control angle δA/2 is formed between a tangent TMA at the first track centre line A of the first pairs of tracks in the central joint plane EM and the longitudinal axis of the outer joint part, with a second control angle δB/2 being formed between a tangent TMB at the second track centre line B of the second pairs of tracks in the central joint plane and the longitudinal axis of the outer joint part, wherein, according to an example, the first control angle γA/2 of the first track centre line A is greater than the second control angle δB/2 of the second track centre line B. More particularly, the control angle δA/2 of the first track centre lines A, which widens towards the aperture end, is, for example, greater than 9° and smaller than 13°. The control angle δB/2 of the track centre lines B, which widens towards the attaching end, is, for example, smaller than 8°, and greater than 6°.

According to an example, a second reference radius RRB is defined for the track centre line B of the outer joint part between a radius centre MRB and a central plane intersection point PEB of the second track centre line B and the central joint plane EM, wherein the radius centre MRB of the second reference radius RRB equals the radius centre MR2 of the second track centre line B at the central plane intersection point PEB, wherein at least a portion of the second track centre line B of the outer joint part extends radially inside a seconds reference arch CRB defined by said second reference radius RRB towards the attaching end. Thus, the wrap angles of the ball tracks around the balls in the inner joint part and the wrap angles of the ball tracks around the balls in the outer joint part are aligned to one another and thereby enhanced.

The design of the second track centre line B, respectively the second ball tracks which open towards the attaching end, can be diverse. For example, in the region of the central joint plane EM, the second track centre line B of the outer joint part comprises a central curved portion B2, which is provided in the form of a circular arch having a radius RB2 around a centre MB2. The centre MB2 of the central portion B2 of the second track centre line B, more particularly, comprises a radial offset away from the second track centre line B relative to the longitudinal axis of the outer joint part. Furthermore, the centre MB2 of the central portion B2 of the second track centre line B comprises an axial offset relative to the central joint plane EM towards the attaching end, with the axial offset of the centre MB2 of the central portion B2 of the second track centre line B corresponding to the axial offset of the centre MA1 of the central portion A1 of the first track centre line A. The radial offset of the centre MB2 of the central portion B2 of the second track centre line B is greater than the radial offset of the centre MA1 of the central portion A1 of the first track centre line A.

According to an example, the second track centre line B in the outer joint part comprises a rear curved portion B3 which adjoins the central curved portion B2 towards the attaching end, wherein the rear curved portion B3 of the second track centre line B of the outer joint part extends radially inside the second reference arch CRB. Said rear curved portion B3 of the second centre portion B is preferably provided in the form of a circular arch with a radius RB3 around a centre MB3, with the radius RB3 of the rear curved portion B3 being smaller than the radius RB2 of the central portion B2 and smaller than the second reference radius RRB.

The centre MB3 of the rear curved portion B3 of the second track centre line B, in one example, comprises a radial offset relative to the longitudinal axis of the outer joint part towards the second track centre line B. Furthermore, the rear curved portion B3, relative to the central joint plane EM, comprises an axial offset towards the attaching end.

According to an example, the second track centre line B of the outer joint part comprises a rear straight portion B4 in the form of a run-out which adjoins the rear curved portion B3 towards the attaching end.

Towards the aperture end, the second track centre line B of the outer joint part, comprises a front portion B1 which continuously adjoins the central portion B2 towards the aperture end. Said front portion B1 preferably extends radially outside the second reference arch CRB defined by the second reference radius RRB. The front portion B1 can be straight or curved, more particularly its direction of curvature can be opposed to the direction of curvature of the central curved portion B2.

In addition to, or alternatively to, the second track centre line B having two radii and two tangents at the ends, the second track centre line B can also be formed by a curve of a higher order, e.g. by an ellipse, a spiral or a hyperbola.

As already mentioned above, the disclosures for the outer joint part accordingly apply to the first and to the second track centre line of the inner joint part, so that, in order to avoid repetition regarding the design of the ball tracks of the inner joint part, reference can be made to the description of the outer joint part. The first and the second track centre lines of the outer joint part, when the joint is in the aligned position, are mirror-symmetrical relative to the central joint plane.

According to an example, there are provided exactly three first pairs of tracks and three second pairs of tracks, with the first and second pairs of tracks being arranged so as to alternate around the circumference. For a counter track joint defined in this way, with six pairs of tracks and torque transmitting balls, the exemplary configuration of the first centre line A widening towards the aperture end is particularly advantageous because, in spite of the small number of balls and the related small number of forces acting on the ball cage, there are achieved particularly reliable cage control conditions, which leads to an improved NVH behaviour. However, it is also possible to provide four or more first pairs of tracks and four of more second pairs of track, with the first and second pairs of tracks being arranged so as to alternate around the circumference.

DRAWINGS

Exemplary configurations of the disclosure will be explained below with reference to the Figures.

FIG. 1a) is an axial view of an exemplary counter track joint.

FIG. 1b) is a cross-sectional view of the joint of FIG. 1a) along longitudinal section sectional line I-I.

FIG. 1c) is a cross-sectional view of the joint of FIG. 1a) along longitudinal sectional line II-II.

FIG. 1d) is an enlarged view of the region X of FIG. 1c).

FIG. 2a) is an axial view of the outer joint part of the counter track joint of FIGS. 1a)-1d).

FIG. 2b) is a cross-sectional view of the part of FIG. 2a) along longitudinal sectional line III-Ill.

FIG. 2c) is a cross-sectional view of the part of FIG. 2a) along longitudinal sectional line IV-IV.

FIG. 3a) is an axial view of the inner joint part of the counter track joint of FIGS. 1a)-1d).

FIG. 3b) is a cross-sectional view of the part of FIG. 3a) along longitudinal sectional line V-V.

FIG. 3c) is a cross-sectional view of the part of FIG. 3a) along longitudinal sectional line VI-VI.

FIG. 4a) is an axial view of the ball cage of the counter track joint of FIGS. 1a)-1d).

FIG. 4b) is a cross-sectional view of the cage of FIG. 4a) along a longitudinal section through two opposed cage windows.

FIG. 4c) is a cross-sectional view of the cage of FIG. 4a) along a longitudinal section through two opposed webs.

FIG. 5a) is a longitudinal cross-sectional view of the outer joint part of the counter track joint of FIG. 1a)-1d), including the course of the first and second ball tracks and the track centre lines of same.

FIG. 5b) is a longitudinal cross-sectional view of the inner joint part of the counter track joint of FIG. 1a)-1d), including the course of the first and second ball tracks and the track centre lines of same.

FIG. 6a) is a longitudinal cross-sectional view of the counter track joint of FIG. 1a)-1d), including the course of the track centre line A with reference to a reference radius RRA.

FIG. 6b) is a longitudinal cross-sectional view of the counter track joint of FIG. 1a)-1d), including the course of the first ball tracks opening towards the aperture end, and respectively the track centre line A with reference to respective tangent angles α at certain joint articulation angles β.

DETAILED DESCRIPTION

Figures 1A, 1B:
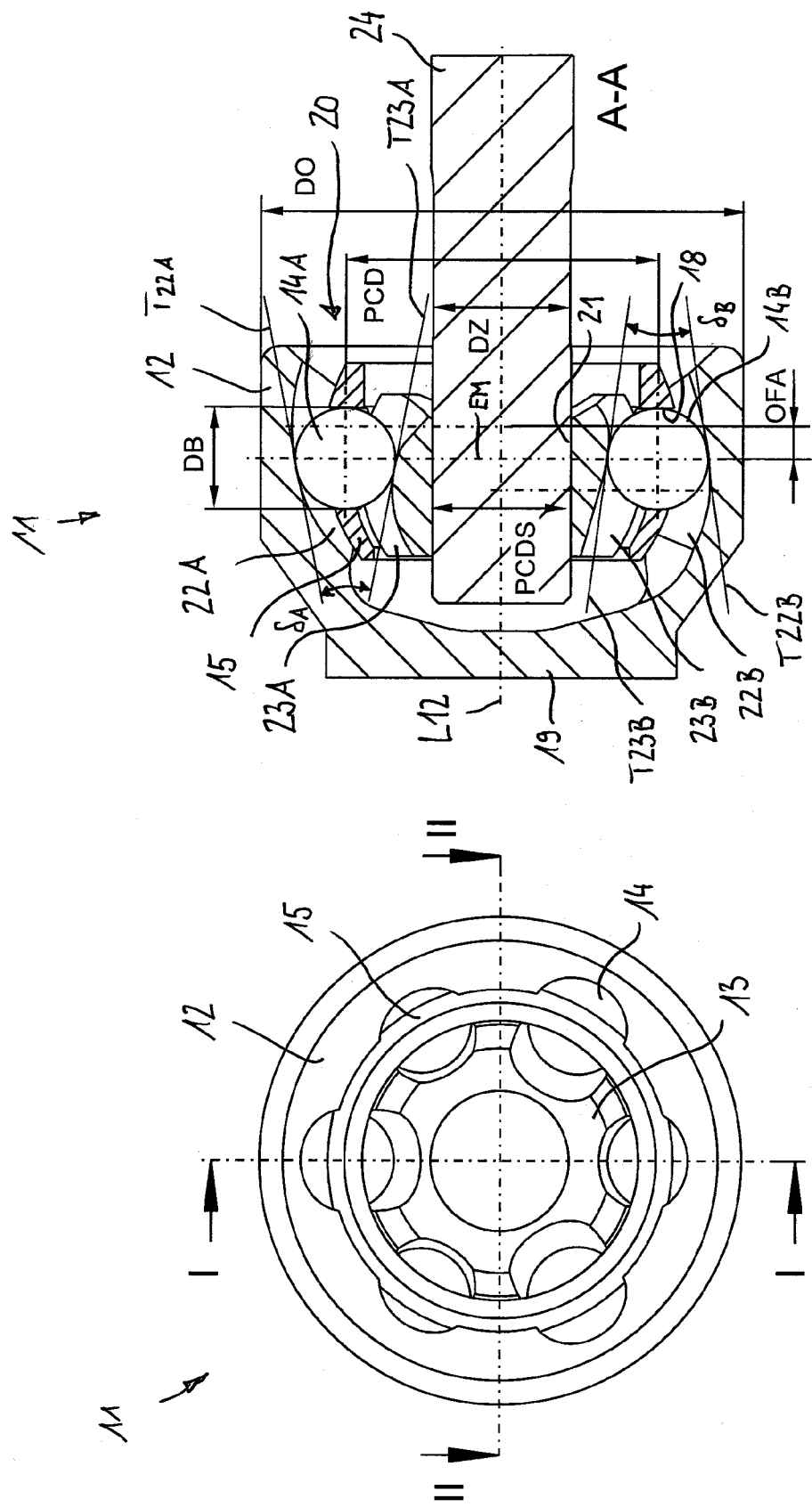

FIGS. 1 to 4 will be described jointly below. They show an exemplary constant velocity universal joint which is provided in the form of a counter track joint 11. The counter track joint 11 comprises an outer joint part 12, an inner joint part 13, six torque transmitting balls 14, as well as a ball cage 15. The ball cage 15 comprises a spherical outer face 16 which is guided in the outer joint part and a spherical inner cage face 17 which is guided on the inner joint part. Between the spherical outer face 16 of the ball cage 15 and a spherical inner face of the outer joint part 12 there is provided a small amount of play. The same applies to the pair of surfaces between the spherical inner face 17 of the ball cage 15 and a spherical outer face of the inner joint part 13. More particularly, it can be seen in FIG.

1 c) that the first surface centre M16 and the second surface centre M17 each comprise an axial distance (offset) relative to the central joint plane EM in opposed directions. The balls 14 are held in circumferentially distributed cage windows 18 in the ball cage 15 in the central joint plane EM. At the outer joint part 12 there is shown a longitudinal axis L12 and at the inner joint part 13 a longitudinal axis L13. The point of intersection of the longitudinal axes L12, L13 and the central joint plane EM forms the joint centre M.

The outer joint part 12 comprises a base 19, which can, for instance, change into an attaching journal, as well as an aperture 20. The inner joint part 13 comprises an aperture 21 into which it is possible to insert, in a rotationally fixed way, a journal of a driveshaft 24 for transmitting a torque. Furthermore, the position of the base indicates the axial direction "towards the attaching end", the position of the aperture 20 end indicates the axial direction "towards the aperture end". Said terms are also used with reference to the inner joint part, with the actual attachment of a shaft to the inner joint part 13 not being taken into account. It is understood that the outer joint part, instead of the base, can also be designed so as to be open towards the attaching end, more particularly in the form of a disc joint.

Around the circumference, there alternate first pairs of tracks 22A, 23A with torque transmitting first balls 14A as well as second pairs of tracks 22B, 23B with torque transmitting balls second balls 14B. The shape of the first pairs of tracks 22A, 23A can be seen in the upper half of the sectional view in FIG. 1 b) and the shape of the second pairs of tracks 22B, 23B in the lower half of FIG. 1 b). The first balls 14A are in contact with first outer ball tracks 22A in the outer joint part and first inner ball tracks 23A in the inner joint part, with the centres of the firs balls 14A, while moving along the outer and inner first ball tracks 22A, 23A, each defining a first track centre line A, A', whereas the centres of the second balls 14B, while moving along the outer and inner second ball tracks 22B, 23B, each define a second track centre line B, B'. Further details regarding the design of said track centre lines A, A', B, B' will be given below.

In the aligned position of the joint as illustrated, i.e. when the outer joint part and the inner joint part are coaxially aligned, the tangents T22A, T23A at the balls 14A form an opening angle SA in the points of contact with the first tracks 22A, 23A, which opening angle SA opens towards the aperture end. The second balls 14B are guided in the outer ball tracks 22B in the outer joint part 12 and in the inner ball tracks 23B in the inner joint part 13. In the illustrated example, the balls 14B are shown in contact with the track base of the ball tracks. In another example, the balls 14B may be free of contact with the track base. In the aligned position as illustrated, tangents T22B, T23B at the second balls 14B in the points of contact with the second tracks 22B, 23B form a second opening angle SB which opens towards the attaching end. For describing the first ball tracks 22A, 23A, reference, furthermore, is made to the centre lines A and A' respectively which are defined by the sum of the ball centres during angular movements of the joint, with the ball centre line A defining the line of the ball centres of the balls 14A in the first ball tracks 22A in the outer joint part 12, which widen towards the aperture end, and with A' defining the ball centre line of the associated first ball tracks 23A in the inner joint part 13. Furthermore, the ball centre line B defines the line of the ball centres of the balls 14B in the second ball tracks 22B in the outer joint part 12 which open towards the attaching end and with B' defining the ball centre line of the associated second ball tracks 23B in the inner joint part 13. Since the ball centre lines A, A'; B, B' are defined by the respective pairs of ball tracks, they can also be referred to as track centre lines or, simply, centre lines.

Figure 1D:
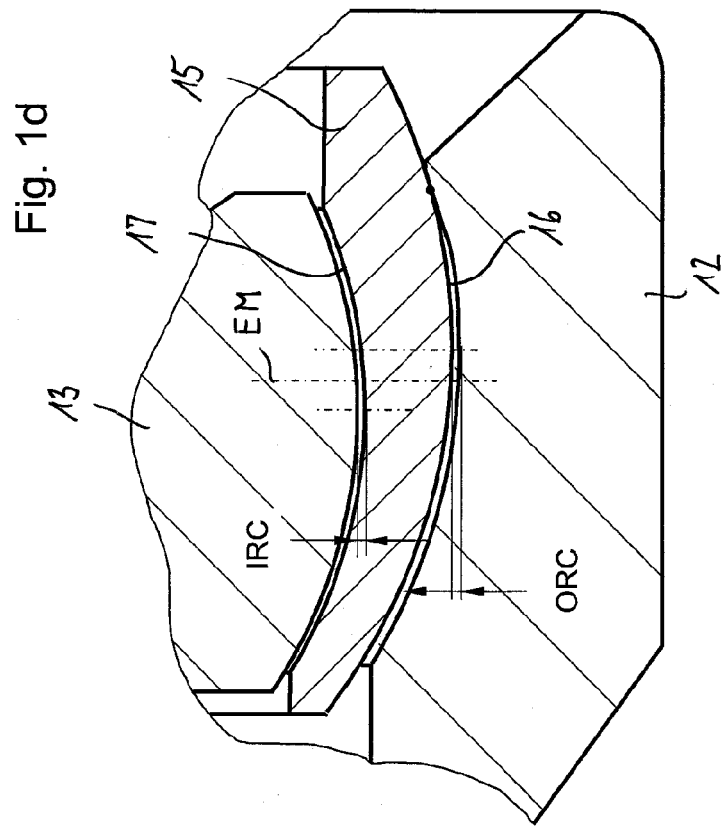
Figure 1C:
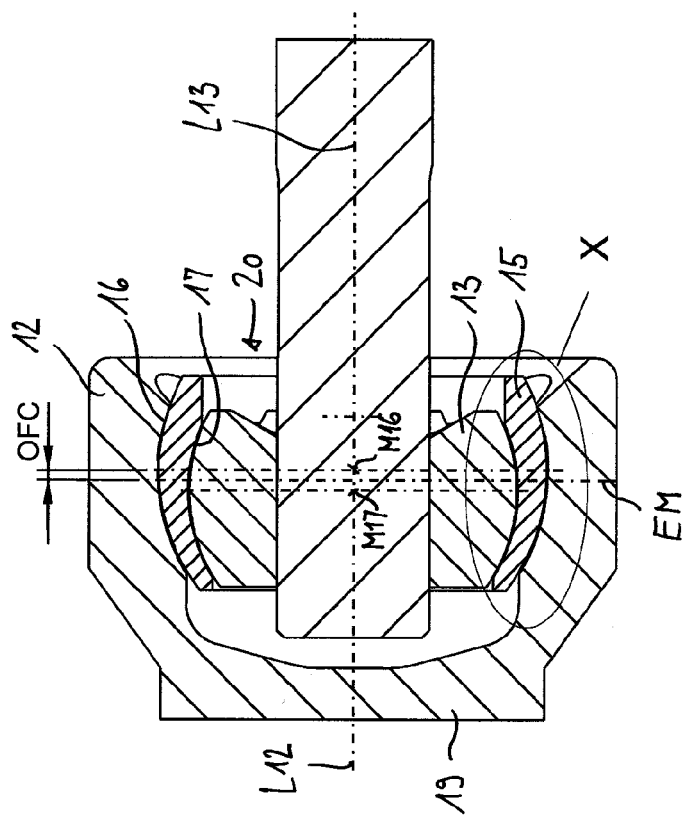
Figure 2:
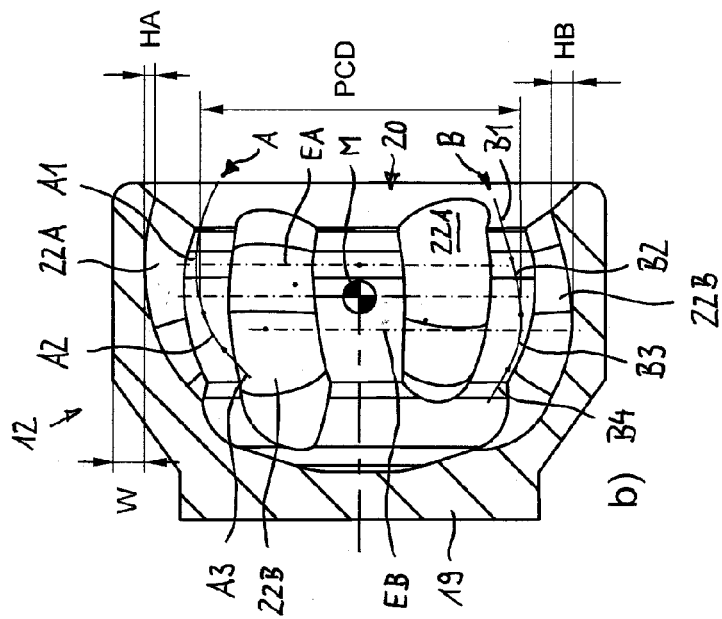
Figure 2:
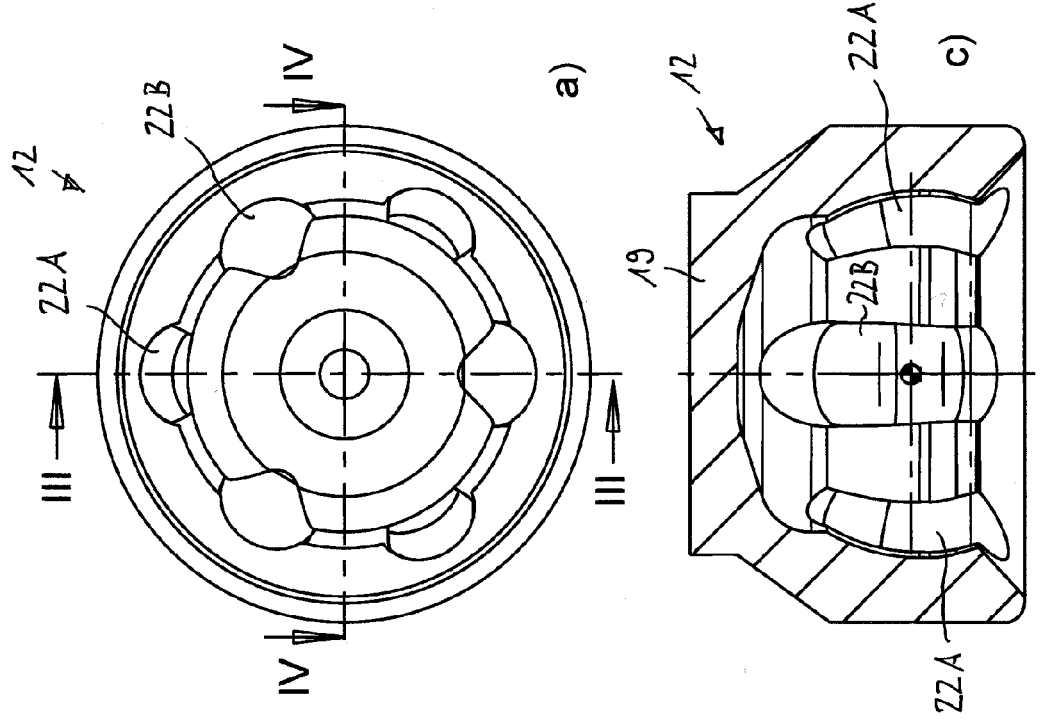
Figure 3:
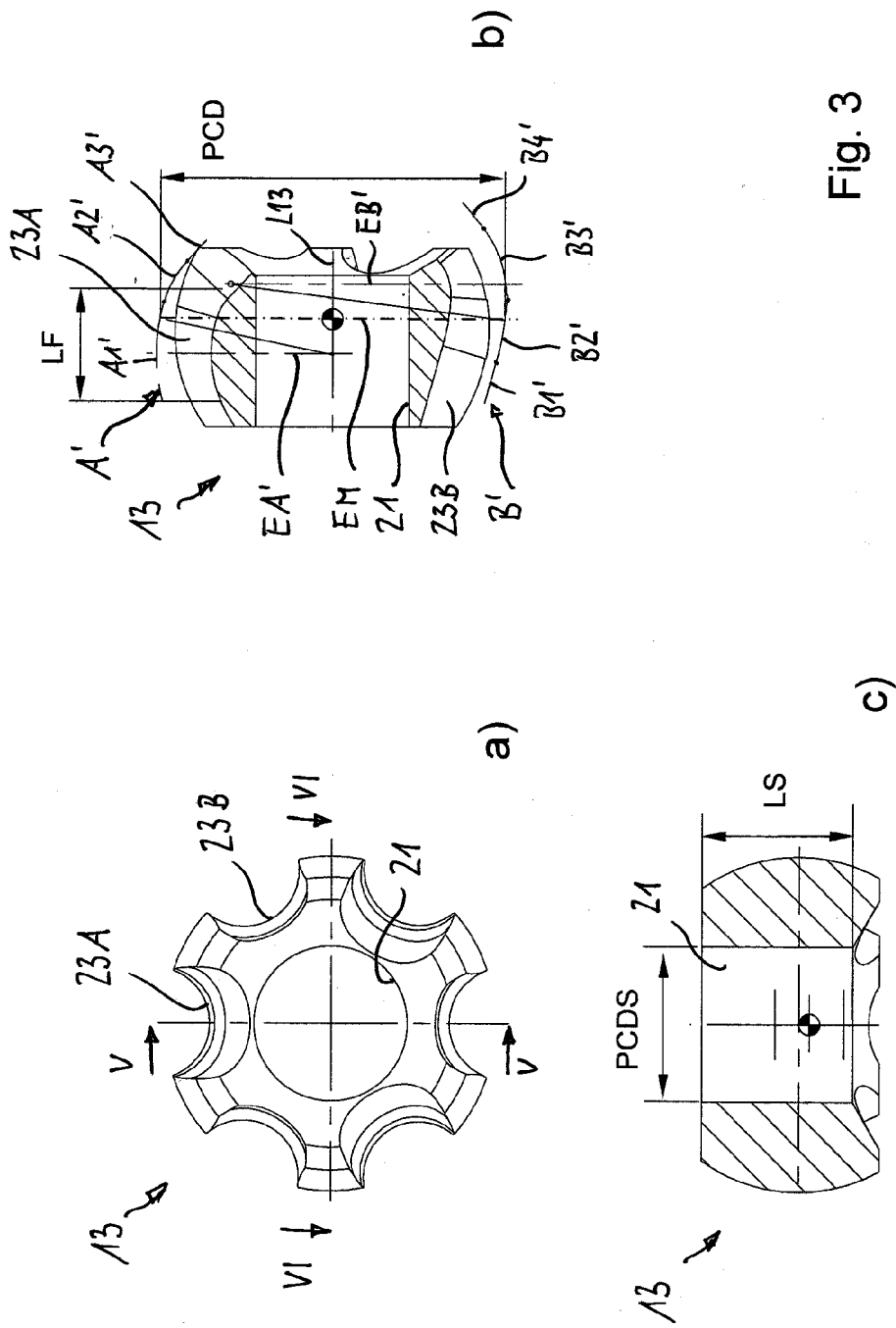
Figure 4:
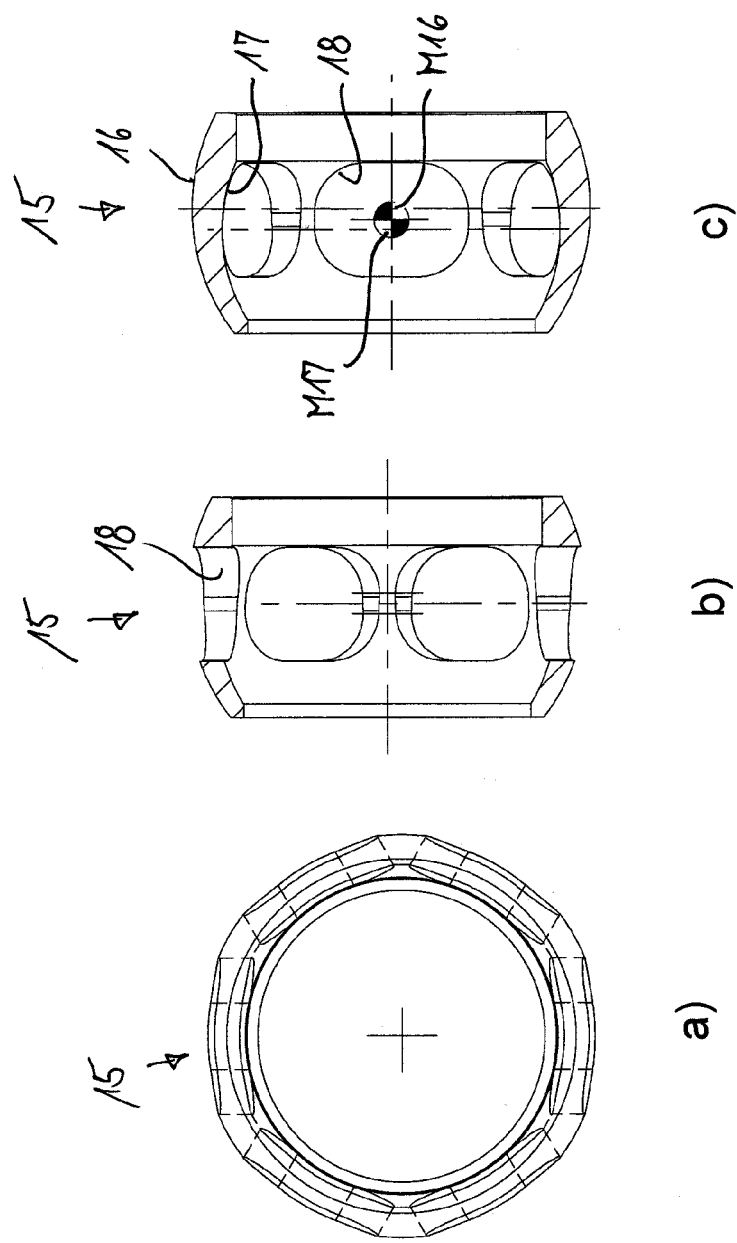

It can be seen in FIGS. 1 a), 2a) and 3a) respectively that each pair of tracks with its centre lines A, B is positioned in a radial plane through the joint and that each ball 14 is received by a cage window 18 in the ball cage 15. Furthermore, it can be seen that a first ball track 22A, 23A of the outer joint part 12 and the inner joint part 13 respectively is positioned diametrically opposite a second ball track 22B, 23B.

More particularly, FIG. 4c shows the cage offset which is formed in that the radius centre M17, for producing the inner spherical face 17, and the radius centre M16, for producing the outer spherical face 16, comprise an axial distance (offset) relative to one another. The two radius centres M16, M17 are arranged so as to be spaced away from the central joint plane EM in opposite directions. As a result of the cage offset, the ball wrap of the balls in the rear portions of the first and second pairs of tracks 22A, 23A; 22B, 23B is increased.

Below, additional details of the counter track joint are disclosed, more particularly, of the design of the first pairs of tracks 22A, 23A which widen towards the aperture end, and of their track centre lines A, A'. In connection with the counter track joint and the design of the ball tracks, the following definitions apply:

The tangent angle α defines the angle which is enclosed between a tangent T at a track centre line A, A' of the outer joint part and of the inner joint part 13 respectively in any track point P and the longitudinal axis L of the outer joint part and inner joint part respectively.

The joint articulation angle β defines the angle which is enclosed between the longitudinal axis L12 of the outer joint part and the longitudinal axis L13 of the inner joint part 13. In an aligned joint the joint articulation angle β amounts to zero.

The track articulation angle β/2 defines the angle which is enclosed by a radial line through the joint centre M and the ball centre together with the central joint plane EM. In every angular position of the joint, the track articulation angle β/2 always amounts to half the joint articulation angle β.

The track portion angle γ of a circular-arch-shaped track portion defines the angle by which, with a uniform radius R, said circular-arch-shaped track portion extends around the radius centre M of said radius R.

The mouth opening angle δ defines the angle which, in an aligned joint, is enclosed between tangents T at the balls in the points of contact with the first ball tracks and second ball tracks, respectively.

The control angle δ/2 defines the angle which, in an aligned joint, is enclosed by a tangent provided in the ball centre at the respective ball track centre line, and the associated longitudinal axis L of the outer joint part, respectively of the associated inner joint part. The control angle δ/2 equals half the mouth opening angle δ.

The centre plane EM is defined by the ball centres of the torque transmitting balls 14 in an aligned joint.

The offset plane EA is defined by a plane which extends parallel to the central joint plane EM and which contains the radius centre MA1 of a central portion A1 of the first ball track centre line A which opens towards the aperture end.

The offset plane EB is defined by a plane which extends parallel to the central joint plane EM and which contains the radius centre MB2 of a central portion B2 of the second ball track centre line B which opens to the attaching end.

A reference radius RRA for the first ball track centre line A of the outer joint part 12 is defined between a radius centre MRA on the longitudinal axis L12 of the outer joint part 12 and a central plane intersection point PEA of the first track centre line A and the central joint plane EM, wherein the radius centre MRA being positioned in the point of intersection of the longitudinal axis L12 and a line which runs through said central plane intersection point PEA and perpendicular to a tangent on the first track centre line A through the central plane intersection point PEA.

The first reference radius RRA for the first track centre line A defines a first reference arch CRA.

The reference radius RRB for the second ball track centre line B of the outer joint part 12 is defined between a radius centre MRB and a central plane intersection point PEB of the second track centre line B and the central joint plane EM, wherein the radius centre MRB of the second reference radius RRB equals the radius centre of a radius which the track centre line B has in said central plane intersection point PEB.

The second reference radius RRB for the second track centre line B defines a second reference arch CRB.

Below, there will follow a description of FIGS. 5a) and 5b).

FIG. 5a) shows the outer joint part 12 with its track centre line A and its track centre line B. The track centre line A of the ball tracks 22A of the outer joint part 12, which widen towards the aperture end, comprises, starting from the aperture end towards the attaching end in the given sequence, a first curved portion A1 which extends from the aperture end of the outer joint part as far as and beyond the central joint plane EM; a second curved portion A2 which continuously adjoins the first portion 1; and a third portion A3 tangentially adjoining the second portion A2. The third portion A3 is straight and forms the end portion of the first ball track A. The first track centre line A, in the direction from the central joint plane EM towards the attaching end, at least by means of a partial portion, extends radially inside a first reference radius RRA, which is explained in greater detail below. Said partial portion extending inside the reference radius RRA comprises at least the second curved portion A2 and the third straight portion A3 of the track centre line A. The first portion A1, in this case, is identical with the reference radius RRA; however, the first portion A1 may extend at least partially radially outside of said reference radius RRA.

The individual portions A1, A2 and A3 are characterised by their different curvatures and radii. The first curved portion A1 of the first track centre line A comprises a circular arch with a uniform first radius RA1 along the length around first centre MA1. The first centre MA1 is axially offset relative to the central joint plane EM and thus defines the offset plane EA. The central curved portion A1 extends towards the attaching end as far as and beyond the central joint plane EM at least around an angular range around the joint centre M of at least 4°, more particularly of approximately 5°. The first central curved portion A1, starting from the first offset plane EA, extends towards the attaching end by a track portion angle γA1 of preferably greater than 16° and smaller than 18° around the first centre MA1. It can be seen that the first centre MA1 is positioned on the longitudinal axis L12 of the outer joint part 12. To that extent, the first radius RA1 corresponds to the first reference radius RRA. However, the first radius may be smaller or bigger than the reference radius RRA, which could be achieved by a radial offset of the radius centre.

The second portion A2 which continuously adjoins the first portion A1 is formed by a circular arch with a uniform second radius RA2 along the length around a second centre MA2. The second centre MA2 for the second portion A2, relative to the longitudinal axis L12 of the outer joint part, comprises a radial offset towards the first ball track centre line A and, relative to the central joint plane EM, an axial offset towards the aperture end. Thus, the second radius RA2 of the rear curved portion A2 is smaller than the radius RA1 of the central portion A1, or, in other words, the second curvature of the near curved portion A2 is greater than the first curvature of the central curved portion A1. The second radius R2 preferably amounts to 0.5 to 0.75 times the first radius R1. Between the central first portion A1 and the second portion A2 at the attaching end, there is defined a transition point PA12, with the circular arch of the second portion A2 at the attaching end, starting from the transition point PA12, extending by a second track portion angle γA2 of preferably greater than 25° and smaller than 27° towards the attaching end.

The curved second portion A2 is tangentially adjoined by the straight third portion A3, with a transition point PA23 being defined between said track portions A2, A3. The straight third portion A3 forms the track run-out of the first ball track centre line A towards the attaching end.

Below, there will follow a description of the design of the second ball track centre line B of the outer joint part 12, which opens towards the attaching end.

Starting from the aperture end of the outer joint part 12 towards the attaching end 19, the track centre line B comprises a first straight portion B1, a curved second portion B2 with a radius RB2 around a centre MB2, an adjoining curved third portion B3 with a smaller third radius RB3 as well as a straight end portion B4 at the attaching end. The first straight portion B1 which can also be referred to as a front portion adjoins the central curved portion B2 towards the qperture end. The front portion B1 extends radially outside the second arc CRB defined by the second reference radius RBB. It can be seen that the central curved portion B2 is provided in the form of a circular arch, with the radius centre MB2, relative to the longitudinal axis L12 of the outer joint part 12, comprising a radial offset away from the second track centre line B. The radial offset of the center MB2 of the central curved portion B2 of the second track center line B and the radial offset of the center of the central curved portion A1 of the first track A differ in size. The centre MB2 of the second central portion B2 of the second track centre line B, relative to the central joint plane EM towards the attaching end 19, comprises an axial offset. The axial offset of the centre MB2 of the central portion B2 of the second track centre line B corresponds to the axial offset of the centre MA1 of the central portion A1 of the first track centre line A. The offset plane EB is defined by a plane which extends parallel to the central plane EM and which contains the centre MB2 of the central curved portion B2 of the second track centre line B.

The rear curved third portion B3, which continuously adjoins the second portion B2 towards the attaching end, is also provided in the form of a circular arch. However, the radius RB3 for said third portion is considerably smaller than the radius RB2 for the second portion B2. Furthermore, the radius centre MB3, relative to the longitudinal axis R12 of the outer joint part 12, comprises a radial offset towards the second track centre line B. This configuration ensures that the curved third portion B3 crosses the second reference arch CRB, which is defined by the second reference radius RRB, in the course from the central joint plane EM towards the attaching end, from radial outside and runs at least with a rear part thereof, respectively at least for the most part, radially inside said reference arch CRB. Also the straight end portion B4 which tangentially adjoins the curved third portion preferably runs radially inside said reference arch CRB. The center MB3 of the rear curved portion B3 of the second track center line B comprises an axial offset relative to the central joint plane towards the attaching end. In contrast thereto, the central portion B2 is positioned radially outside the reference arch CRB defined by the second reference radius RRB.

Between the first portion B1 and the second portion B2 there is formed a transition point PB12 in which the curvature of the second portion B2 tangentially changes into the first portion B1. Furthermore, between the second portion B2 and the rear third portion B3 there is formed a transition point PB23 in which the curvature of the second radius RB2 continuously changes into the curvature of the third radius RAB3. The second portion extends by a track portion angle γB2 which ranges between 12° and 13°. The third portion B3 extends by a track portion angle γB3 around the radius centre MB3 of approximately 33° to 34°. The transition point between the third portion B3 and the fourth portion B4 has been given the reference number PB34.

FIG. 5b) shows the inner joint part 13 of the counter track joint 11 in a longitudinal section through the ball tracks 23A, 23B. The first ball track 23A, which widens towards the aperture end, defines the first track centre line A', whereas the second ball tracks B', which widen towards the attaching end, define the second track centre line B' of the inner joint part.

The first ball track centre line A' of the inner joint part 13 is complementary to the first ball track centre line A of the outer joint part 12, which means that the ball track centre line A' of the inner joint part 13 is mirror-symmetric relative to the ball track centre line A of the outer joint part 12 with reference to the central joint plane EM. Accordingly, the second ball track centre line B' of the joint inner part 13 is complementary to the second ball track centre line B of the outer joint part 12, which means that the second track centre line B' of the inner joint part 13 is mirror-symmetric relative to the joint track centre line B of the outer joint part 12 with reference to the central joint plane EM.

Therefore, to avoid any repetition regarding the course taken by the first and second ball track centre lines A', B' of the inner joint part 13, reference is made to the explanations made above and below in connection with the description of the outer joint part 12.

Figure 6:
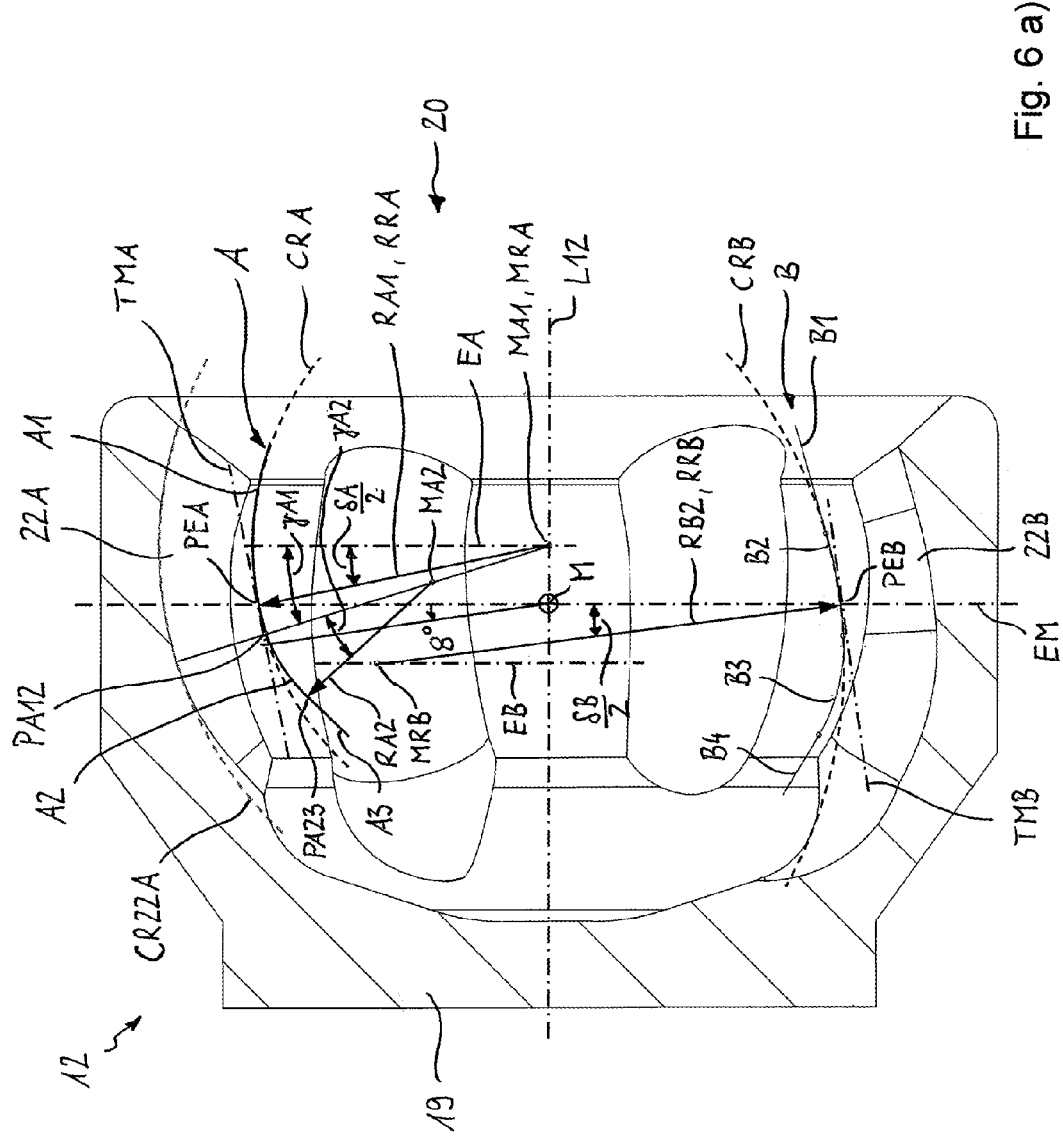
Figure 6:
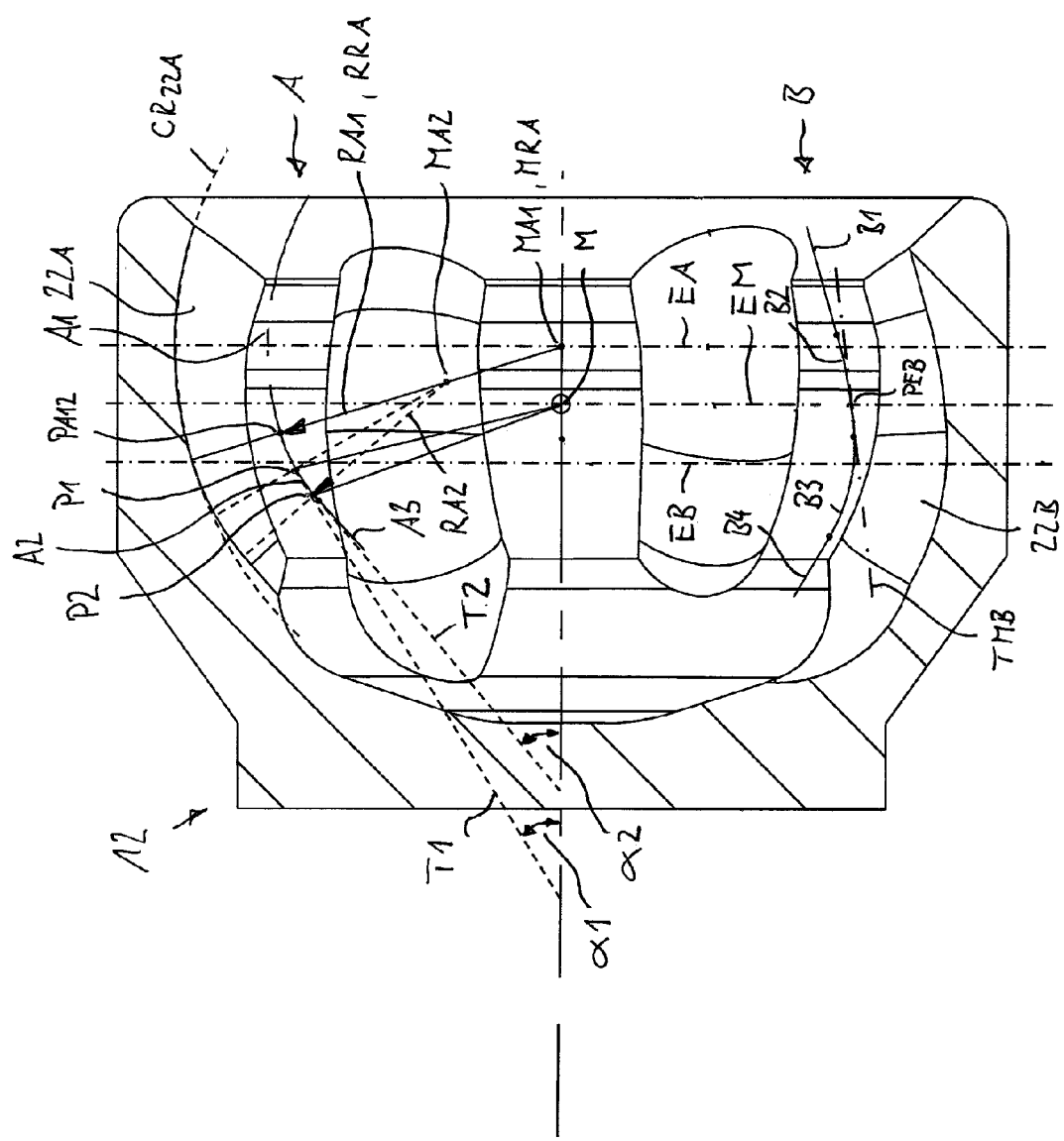

FIGS. 6a) and 6b) show further details regarding the track shapes of the first ball Tracks 22A of the outer joint part 12 which widen towards the aperture end. FIG. 6a) shows the first reference radius RRA at the first track centre line A in the central joint plane EM, whose radius centre MRA is positioned on the longitudinal axis L12 of the outer joint part. The radius centre MRA is defined by the point of intersection of a perpendicular line on the tangent TMA at the first track centre line A in the central joint plane EM with the longitudinal axis L12. A central plane intersection point PEA is defined between the track centre line A and the joint central plane EM, said tangent TMA running through said joint central plane intersection point PEA. Furthermore, it can be seen that the first track centre line A extends from the transition point PA12 between the first and the second portion A1, A2, towards the attaching end inside the first reference arch CRA defined by said first reference radius RRA. More particularly, the first track center line A extends radially inside the reference arc CRA towards the attaching end at least starting from an angle of 8° around the joint center M with respect to the joint center plane. Accordingly, the track base of the first ball track 22A of the outer joint part in the rear portion, leaves radially inwardly a corresponding reference arch CR22A, which extends parallel to the reference arch CRA of the track centre line A. Thus, in said rear portion A2, A3 relatively large tangent angles α are achieved, of tangents provided at the track centre line A and at the track base respectively. More particularly, the tangent angles α are greater if the ball track with a uniform radius continues from the central track plane towards the attaching end. The increased tangent angles α lead to an increased introduction of force from the balls 14A in said first ball tracks 22A, 23A into the ball cage 15 which, as a result, can be controlled more effectively on to the angle-bisecting plane, while generating less undesirable noise.

Furthermore, the outer joint part is shown to comprise the tangent TMA at the first track centre line A in the central joint plane EM. Between said tangent TMA and the longitudinal axis L12 and between a perpendicular line on the tangent TMA and the offset plane EA of the outer joint part 12, there is formed the first control angle δA/2. The second track centre line B, in the central joint plane EM, is shown to comprise a second tangent TMB which, together with the longitudinal axis L12 of the outer joint part 12, encloses the second control angle δB/2. The first control angle δA/2 of the first track centre line A is greater than the second control angle δB/2 of the second track centre line B. More particularly, it is proposed that the control angle δA/2 of the first track centre lines A widening towards the aperture end is greater than 9° and, more particularly, smaller than 13°. The control angle δB/2 of the track centre lines B which widens towards the attaching end is preferably smaller than 8° and more particularly greater than 6°.

As shown in FIG. 6b), the rear second portion A2 of the first track centre line A of the outer joint part 12 is designed such that a first tangent angle α1 which is enclosed between a tangent T1 at the first track centre line A in a track point P1 and the longitudinal axis L12 of the outer joint part amounts to a value between 28° and 38°, more particularly 33°. When the inner joint part 13 is articulated relative to the outer joint part 12 by 30°, the track point P1 is defined by the position of the ball centre in the first track centre line A, or, in other words, the track point P1 is defined by the point of intersection of the first track centre line A and a straight line through the joint centre M, which straight line encloses an angle of 15° with the central joint plane EM.

Furthermore, it can be seen that a second tangent angle α2 which is enclosed between a second tangent T2 at the first track centre line A in a track point P2 and the longitudinal axis L12 of the outer joint part 12 amounts to a value between 36° and 46°, more particularly approximately 40°. The second track point P2 is defined by the position of the ball centre in the first track centre line A when the inner joint part 13 is articulated relative to the outer part 12 by 40°. Or, in other words: the second track point P2 is defined by the point of intersection of the first track centre line A and a straight line through the joint centre M, which straight line, together with the central joint plane EM, enclose an angle of 20°.

The large tangent angles α in the rear curved portion A2 and thus also in the rear straight portion A3 effect an improved introduction of force from the balls 14A in said first ball tracks 22A, 23A into the ball cage 15 which, therefore, can be controlled more easily on to the angle-bisecting plane, with less undesirable noise being generated.

It is understood that the large tangent angles α in the rear portions A2, A3 can also be achieved through configurations other than the track shape illustrated. For example, the second rear portion A2 can have a shape which deviates from a circular arch, such an elliptical, spiral-like or hyperbolic shape. In another example, the third portion A3 comprises a shape which deviates from a straight line, i.e. a curvature. But in any case, even if the first ball track centre line A had a shape other than the shapes described for the portions A1, A2, A3, a rear portion would extend radially inside the first reference radius RRA and, would enclose larger tangent angles α with the longitudinal axes than would be the case with ball tracks with a uniform radius along their length.

Figure 7:
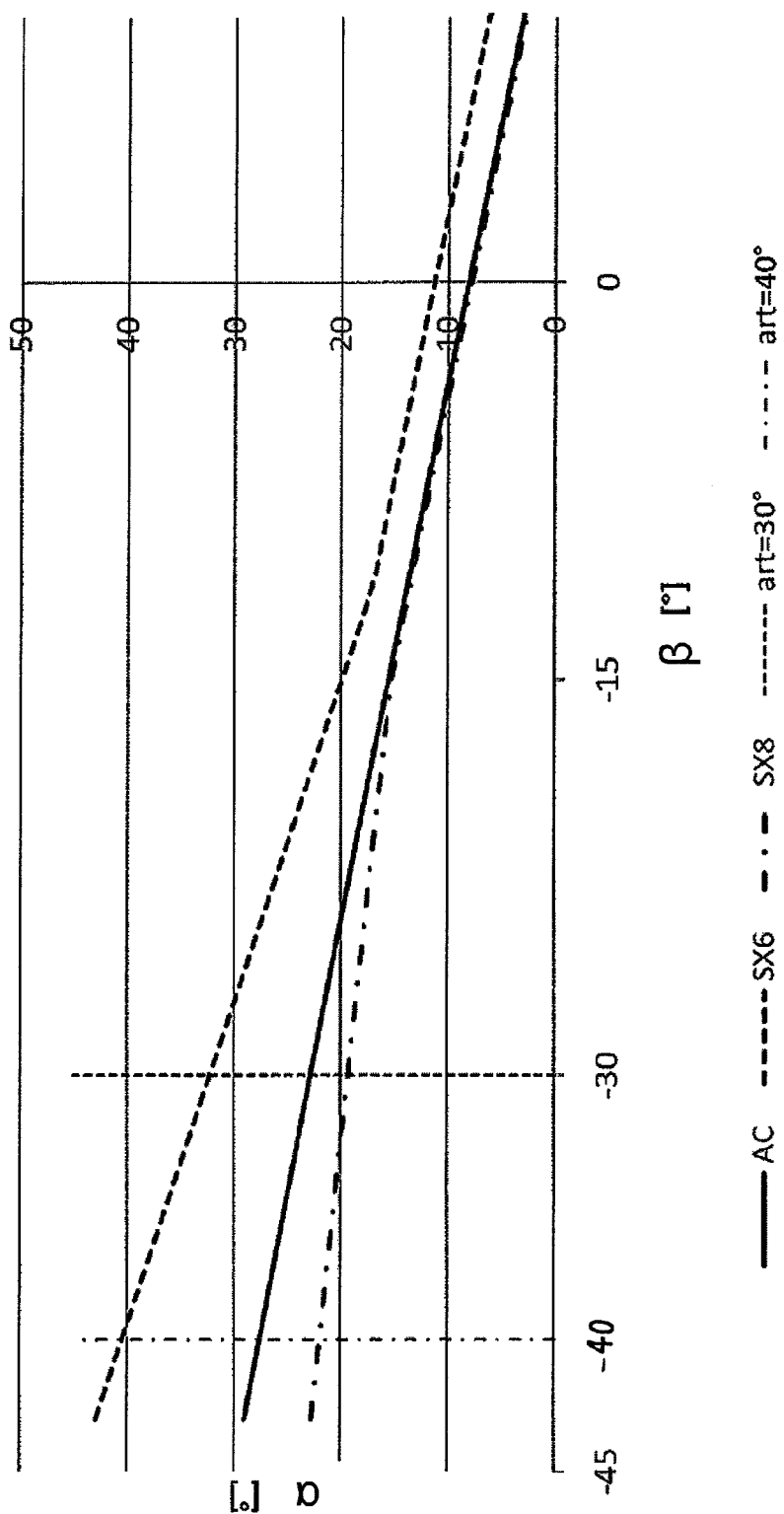
FIG. 7 is a diagram of a graph of a curve of the tangent angle α of the first pairs of tracks, respectively of the first track centre line A, as a function of the articulation angle β for the counter track joint according to FIG. 1.

FIG. 7 graphically shows the course taken by the tangent angle α of the first track pairs 22A, 23A as a function of the articulation angle β for the counter track joint 11 according to FIG. 1 as compared to the joints known from the state of the art. FIG. 7 shows the course taken by the angle α as a function of the articulation angle β from 0° to approximately 45° for three joints. The upper dashed line (SX6) represents the course taken by the tangent angle α as a function of the articulation angle β for the joint 11 according to FIG. 1. On the other hand, the continuous line (AC) contains the tangent angle α as a function of the articulation angle for a so-called AC joint. The dash-dotted line (SX8) which is the flattest line shows the ratio of the tangent angle α as a function of the articulation angle β for a counter track joint with eight balls of type SX8.

The AC joint used for comparative purposes comprises ball tracks which are of uniform design relative to one another. Along the entire length, the ball tracks comprise a continuously uniform radius around a radius centre which is positioned on the longitudinal axis of the inner joint part and of the outer joint part respectively.

Figure 5:
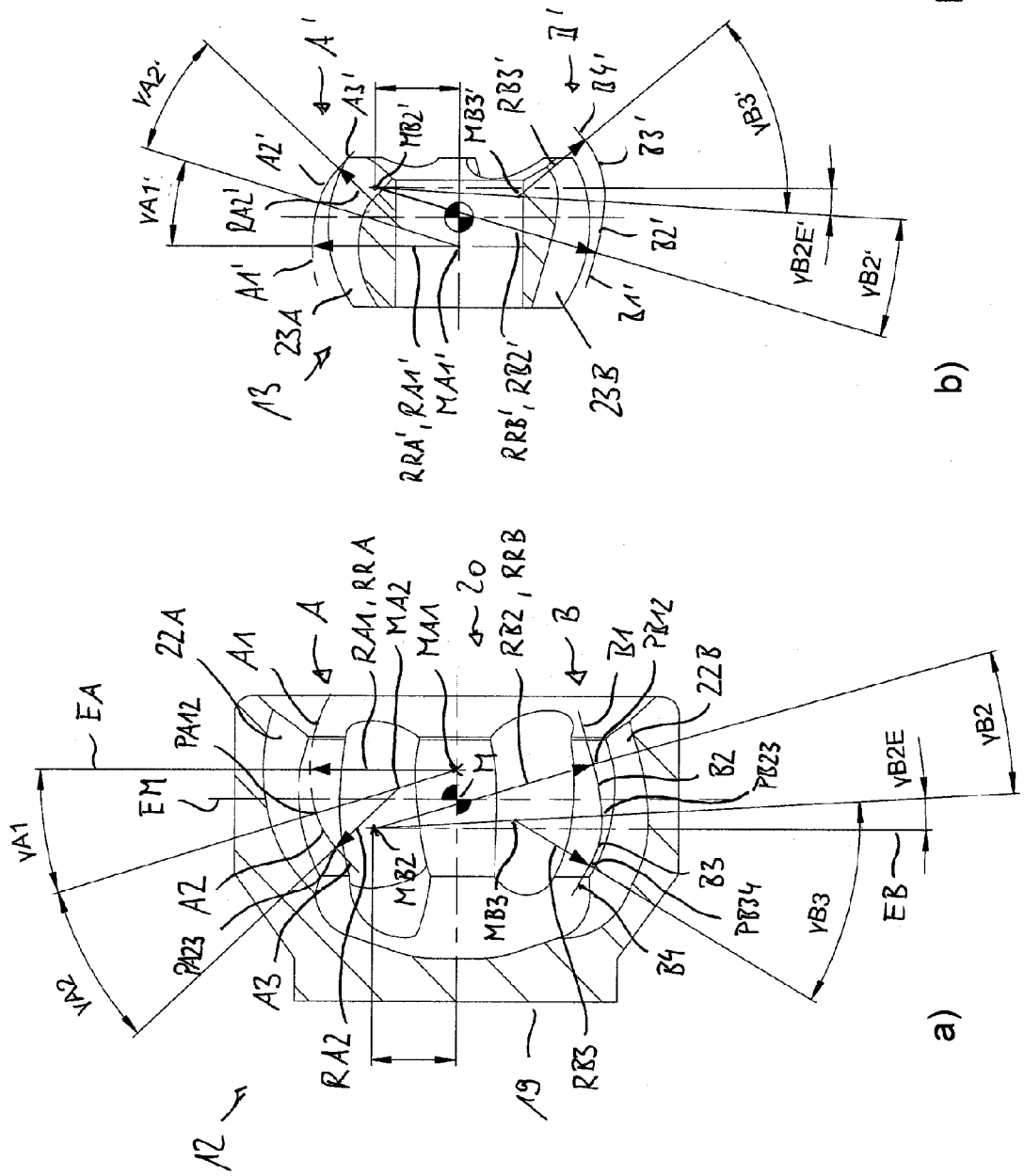

The SX8 joint which is also used for comparative purposes is a counter track joint as shown in FIG. 5 of WO 2008/043384 A1. In the rear portion of said counter track joint, the ball tracks of the outer joint part, which widen towards the aperture end, comprise a radius which is increased relative to the radius of the central portion.

In FIG. 7, for the articulation angles 30° and 40°, in the point of intersection with the extensions of the tangent angles α as a function of the articulation angle β, there are formed concrete points of intersection which give the tangent angle α for said concrete articulation angles of 30° and 40°.

It can be seen that, from an articulation angle of approximately 10° onwards, the course taken by the tangent angle α for the counter track joint 11 is steeper than the respective tangent angles for the prior art AC- and SX8-joints respectively. At an articulation angle of 30°, there is obtained for the joint a concrete tangent angle α of approximately 33°. On the other hand, the tangent angles for the AC joint amount to approximately 23° only and the tangent angle α for the SX8-joints amounts to approximately 19°.

At an articulation angle of 40°, the tangent angle α for the SX6-joint amounts to approximately 40°, whereas the respective tangent angles α of approximately 28° for the prior art AC joint and approximately 220 for the SX8 joint is clearly smaller.

The increase in the tangent angle α as a function of the articulation angle is achieved by the design of the first pairs of tracks 22A, 23A and of the first ball track centre lines A, A' which extend inside the reference radius RRA, RRA'.

Overall, the graphics of FIG. 7 show that the tangent angle α for articulation angles from 10° onwards are clearly larger than in the case of the prior art AC- and SX8 joints. This measure ensures an improved cage control of the ball cage 15, which will be explained in greater detail in connection with FIG. 8.

Figure 8:
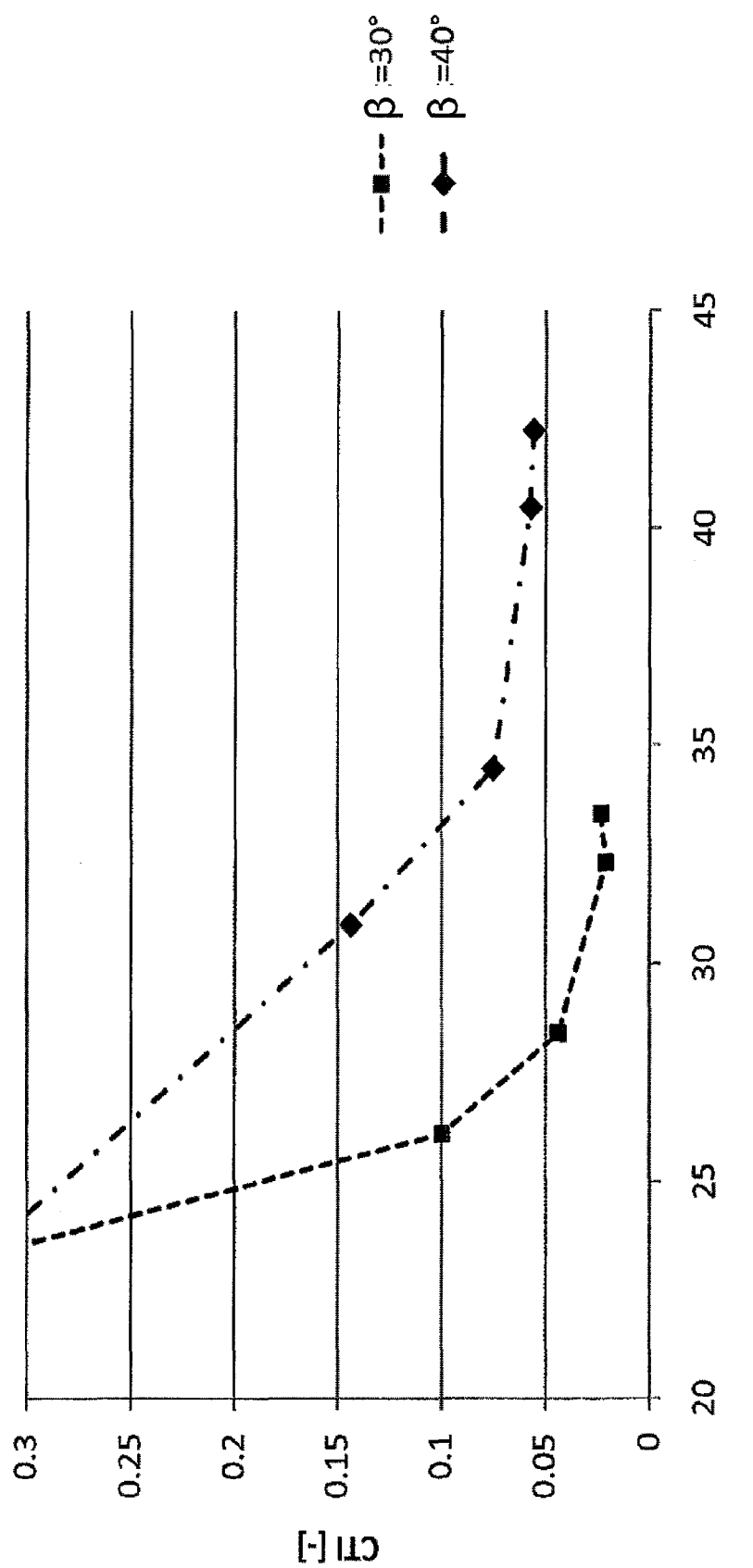
FIG. 8 is a diagram of a gram of a curve of the cage tumbling index (CTI) for different tangent angles α for the counter track angle according to FIG. 1.

FIG. 8 graphically illustrates the curve of the cage tumbling index (CTI) as a function of the tangent angle α at defined articulation angles β. The graphics show that the CTI for larger tangent angles α clearly decreases. More particularly, at an articulation angle of 30° and a tangent angle of approximately 26°, the cage tumbling index CTI for the counter track joint is below 0.1. In the case of larger tangent angles of 28° to 34°, the cage tumbling index (CTI) is below 0.05. The relationship between the cage tumbling index (CTI) and the tangent angle α at an articulation angle β of 30° is illustrated by a dashed line.

The respective relationship for an articulation angle of 40° is illustrated by a dash-dotted line. It can be seen that at a tangent angle α of 33° there is already achieved a cage tumbling index of smaller than 0.1. At greater tangent angles α, i.e. at a greater curvature of the first pairs of tracks 22A, 23A towards the longitudinal axis L12, L13, even smaller cage tumbling indices (CTI) of less than 0.07 are achieved.

It is particularly advantageous if the track centre line A, A' is designed in such a way that the tangent angle α for the first track centre lines A, A' at joint articulation angles β of 30° ranges between 28° and 38° and that tangent angle α at a joint articulation angle β of 40° ranges between 36° and 46°. Advantageous values for intermediate articulation angles are achieved by interpolation. The ranges given, more particularly, apply to counter track joints with 6 balls, because due to the smaller number of balls controlling the cage, the improved introduction of force is advantageous. In counter track joints with eight balls, said ranges for the tangent angle α at a given articulation angle β can be slightly smaller, for example reduced by 2°.

The simulations and graphics according to FIG. 8 prove that the tangent angle α in the rear range of the track centre lines A, A' decisively influences the cage control at large articulation angles, i.e. the greater the tangent angle α, the better the cage moments are balanced. Vice versa, the greater the CTI index, the worse the cage balance. The CTI index should be smaller than 0.1 in order to ensure that even at lower temperatures, the counter track joint features a reliable cage control and a low noise level, more particularly at large articulation angles.

Figure 9:
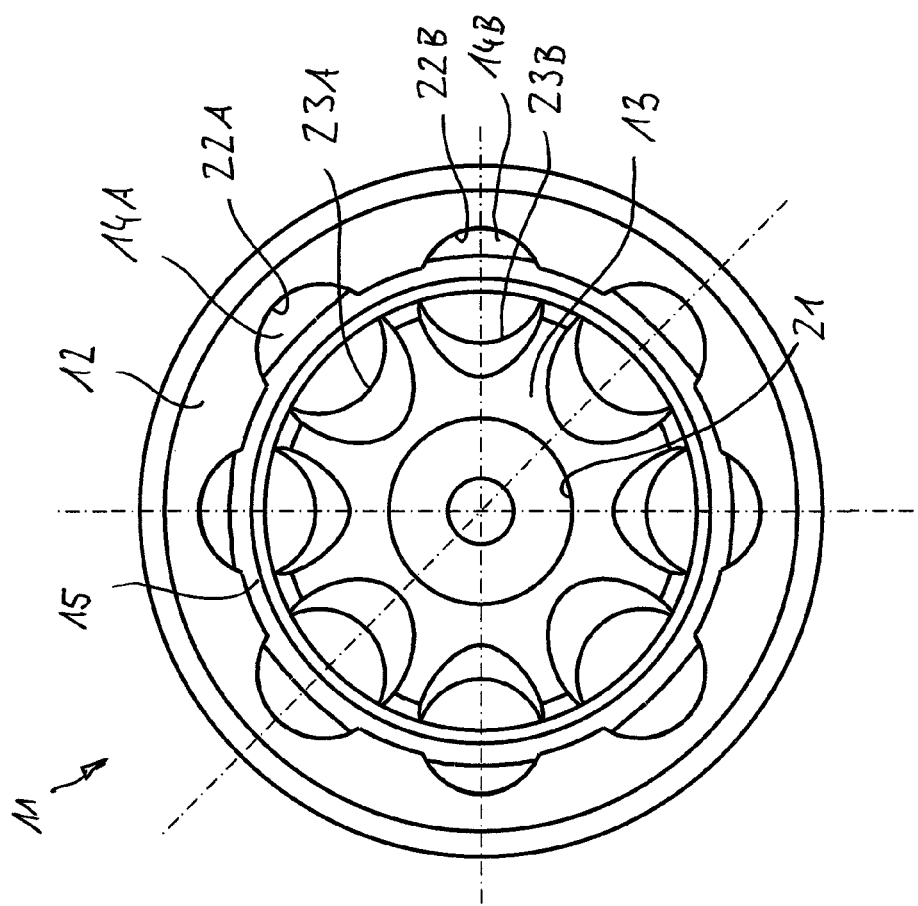
FIG. 9 is an axial view of another exemplary counter track joint.

FIG. 9 shows another exemplary counter track joint in an axial view. This joint substantially corresponds to the counter track joint according to FIGS. 1 to 6, so that with regard to common features reference can be made to the above description, with same parts having been given the same reference numbers. The only difference exists in the number of torque transmitting balls, respectively of the ball tracks, which amounts to eight in the present example. The first pairs of tracks 22A, 23A, which open towards the aperture side and which define the first track centre line A, and the second pairs of tracks 22B, 23B, which open towards the attachment side and which define the second track centre line B, are arranged so as to alternate over the circumference. Due to the total number of eight balls the result is that in each case two first pairs of tracks 22A, 23A, and respectively two second pairs of tracks 22B, 23B, are arranged diametrically opposed relative to each other. The design of the first ball tracks 22A, 23A and the track centre line A, respectively, of the present example, correspond with the first ball tracks 22A, 23A and the first track centre line A, respectively, of the example shown in FIGS. 1 to 6. The same applies to the second ball tracks 22B, 23B, respectively the second track centre line B. Also, the other features mentioned in connection with the example according to FIGS. 1 to 6, and thus the respective advantages described in connection with FIGS. 7 and 8, also apply for the present counter track joint having eight balls, so that in this regard reference can be made to the above description.

A counter track joint with six balls according to FIGS. 1 to 6 or with eight balls according to FIG. 9 is particularly optimised for an articulation angle of less than 47°, if the following relationships between individual parameters, respectively the following ratios for individual parameters, are observed:

$0.26 < DZ/DO < 0.34$ $0.27 < PCDS/DO < 0.33$ $1.31 < PCDS/DB < 1.51$ $2.7 < PCD/DB < 3.8$ $2.2 < PCD/PCDS < 2.5$ $2.2 < PCD/DZ < 2.7$ $0.2 < OFC/OFA < 0.5$ $1.2 < HB/HA < 3.5$ $1.3 < PCDS/LF < 1.8$ $0.01 < ORC < 0.2$ $0.01 < IRC < 0.2$ $W > 2.5$ mm $-0.02$ mm $< SKR < +0.05$ mm $-0.04$ mm $< SKF < +0.04$ mm

In said relationships, the parameters used have the following meaning:
- DZ: Outer diameter of the journal in a region which, when the joint is articulated, can contact the outer joint part,
- DO: Outer diameter of the outer joint part
- PCD: Pitch circle diameter of the balls
- PCDS: Pitch circle diameter of the shaft splines
- DB: Ball diameter
- OFA: Ball track offset for track A opening towards the aperture end
- OFC: Cage offset
- ORC: Radial play between outer joint part and ball cage
- IRC: Radial play between inner joint part and ball cage
- HA: Undercut of first ball track (outer joint part)
- HB: Undercut of second ball track (outer joint part)
- LF: Functional length, i.e. axial distance covered by a ball in the inner joint part, when the joint is articulated by an angle of 47°,
- W: Radial thickness between deepest track base and outer face of the outer joint part
- SKR: Radial ball play in ball tracks
- SKF: Ball play in cage windows For a maximum articulation of the joint it can be provided that the balls move out of the cage window of the ball cage. In this case, a maximum movement of the balls out of the respective cage window of up to 0.5 mm is possible. The minimum wrap angle of the ball tracks around the balls is preferably bigger than 40° for the outer joint part and preferably bigger than 45° for the inner joint part.

The mentioned values and ratios, respectively, in particular apply for counter track joints with six or eight torque transmitting balls having a maximum articulation angle of 47°. However, it is understood that counter track joints can be designed with other maximum articulation angles, particularly including maximum articulation angles between 40° and 52°. With respect to these articulation angles of 40° to 52° the above mentioned values and ratios, respectively, would be adapted accordingly.

The invention claimed is:

1. A constant velocity joint in the form of a counter track joint, comprising:
   an outer joint part which comprises a longitudinal axis and an attaching end and an aperture end which are axially opposed relative to one another, and which also comprises first outer ball tracks and second outer ball tracks;
   an inner joint part which comprises a longitudinal axis and an attaching portion for a shaft which points to the aperture end of the outer joint part, and which inner joint part comprises first inner ball tracks and second inner ball tracks,
   wherein the first outer ball tracks and the first inner ball tracks, together, form first pairs of tracks which, when the counter track joint is in an aligned position, widen towards the aperture end of the outer joint part, and
   wherein the second outer ball tracks and the second inner ball tracks, together, form second pairs of tracks which, when the counter track joint is in the aligned position, widen towards the attaching end of the outer joint part;
   a torque transmitting ball in each of the first pair of tracks and in each of the second pair of tracks;
   an annular ball cage which is arranged between the outer joint part and the inner joint part and comprises circumferentially distributed cage windows which each accommodate at least one of the torque transmitting balls;
   wherein, with coaxially aligned longitudinal axes of the inner joint part and of the outer joint part, the balls are held by the ball cage on a central joint plane and, in the case of an angular movement of the inner joint part relative to the outer joint part, the balls are guided onto an angle-bisecting plane between the longitudinal axes;
   wherein the centres of the balls of the first ball tracks, when said balls are moved along the outer and inner first ball tracks, each define a first track centre line,
   and wherein the centres of the balls of the second tall tracks, when said balls are moved along the outer and inner second ball tracks each define a second track centre line;
   wherein a first reference radius is defined between a radius centre on the longitudinal axis of the outer joint part and a central plane intersection point of the first track centre line and the central joint plane, wherein the radius centre is positioned at the intersection of the longitudinal axis and a line which runs through said central plane intersection point and which is perpendicular to a tangent on the first track centre line through the central plane intersection point;
   wherein, in the direction from the central joint plane towards the attaching end, at least a portion of the first track centre line extends radially inside a reference arc defined by the first reference radius.

2. A counter track joint according to claim 1, wherein the first track centre line extends radially inside the reference arc towards the attaching end at least starting from an angle of at least 8° around the joint centre with respect to the joint centre plane.

3. A counter track joint according to claim 1, wherein in the intersection between the first track centre line and a straight line through the joint centre, which straight line defines an angle of 15° with the central joint plane, a first rear centre line point is defined,
   wherein, in the outer joint part, a rear portion of the first track centre line is designed such that a first tangent angle which is enclosed between a first tangent at the first track centre line in the first rear centre line point, and the longitudinal axis of the outer joint part ranges between 28° and 38°.

4. A counter track joint according to claim 1, wherein in the intersection between the first track centre line and a straight line through the joint centre, which straight line defines an angle of 20° with the central joint plane, a second rear centre line point is defined,
   wherein, in the outer joint part, a rear portion of the first track centre line is designed such that a second tangent angle which is enclosed between a second tangent at the first track centre line in said second rear centre line point, and the longitudinal axis of the outer joint part ranges between 36° and 46°.

5. A counter track joint according to claim 1, wherein in the first track centre line of the outer joint part, in the region of the central joint plane, comprises a central curved portion with a first curvature, which central curved portion, with reference to the joint centre, extends in an angular region of at least 3° in magnitude around the central joint plane, and a rear curved portion with a second curvature, which rear curved portion adjoins the central curved portion towards the attaching end, wherein the second curvature of the rear curved portion is greater than the first curvature of the central curved portion.

6. A counter track joint according to claim 1, wherein a central curved portion of the first track centre line is formed by a circular arch with a radius round a centre and
that a rear curved portion of the first track centre line is formed by a circular arch with a second radius around a second centre, wherein the second radius of the rear curved portion is smaller than the first radius of the central curved portion.

7. A counter track joint according to claim 6, wherein in the outer joint part, the center of the circular arch of the rear curved portion comprises at least one of a radial offset relative to the longitudinal axis of the outer joint part and an axial offset relative to the central joint plane.

8. A counter track joint according to claim 1, wherein the first track centre line of the outer joint part comprises a straight rear portion in the form of a run-out which tangentially adjoins a curved rear portion.

9. A counter track joint according to claim 1, wherein in the outer joint part, there is defined a first offset plane towards the aperture end, which extends parallel to the central joint plane and contains the centre of a central curved portion of the first track centre line,
wherein the central curved portion of the first track centre line, starting from the first offset plane, extends over a track angle which ranges between 16° and 18° towards the attaching end.

10. A counter track joint according to claim 1, wherein in the first track centre line between a central curved portion and a rear curved portion, there is defined a transition point, wherein a circular arch of the rear curved portion, starting from the transition point, extends over a track angle of greater than 20° towards the attaching end.

11. A counter track joint according to claim 1, wherein the ball cage comprises an inner spherical surface with an inner radius around a first surface centre, and an outer spherical surface with an outer radius around a second surface centre, wherein the first surface centre and the second surface centre comprise an axial distance from one another.

12. A counter track joint according to claim 1, wherein, in the outer joint part, a first control angle is enclosed between a tangent on the first track centre line in the central joint plane and the longitudinal axis of the outer joint part, and
that, in the outer joint part, a second control angle is enclosed between a tangent on the second track centre line in the central joint plane and the longitudinal axis of the outer joint part,
wherein the first control angle of the first track centre line is greater than the second control angle of the second track centre line.

13. A counter track angle according to claim 1, wherein a second reference radius is defined for the second track centre line of the outer joint part between a radius centre and a central plane intersection point of the second track centre line and the central joint plane, wherein the radius centre of the second reference radius equals the radius centre of the second track centre line in the central plane intersection point,
wherein at least a portion of the second track centre line of the outer joint part extends radially inside a second reference arch defined by the second reference radius.

14. A counter track joint according to claim 13, wherein the second track centre line comprises a central curved portion in the region of the central joint plane, the central curved portion having a radius around a centre, and a rear curved portion adjoining the central curved portion towards the attaching end, the rear curved portion having a radius around a centre,
wherein the radius of the rear curved portion is smaller than the radius of the central curved portion.

15. A counter track joint according to claim 14, wherein, in the outer joint part, the centre of the central curved portion of the second track centre line, comprises, relative to the longitudinal axis of the outer joint part, a radial offset extending away from the second track centre line and, relative to the central joint plane, an axial offset extending towards the attaching end.

16. A counter track joint according to claim 1, wherein a radial offset of a centre of a central curved portion of the second track centre line and a radial offset of a centre of a central curved portion of the first track centre line differ in size.

17. A counter track joint according to claim 1, wherein, in the outer joint part, a centre of a rear curved portion of the second track centre line comprises, relative to the longitudinal axis of the outer joint part, a radial offset towards the second track centre line and, relative to the central joint plane an axial offset extending towards the attaching end.

18. A counter track joint according to claim 1, wherein the second track centre line of the outer joint part comprises a rear straight portion in the form of a run-out which tangentially adjoins the rear curved portion.

19. A counter track joint according to claim 1, wherein the second track centre line of the outer joint part comprises a front portion which adjoins a central curved portion towards the aperture end, wherein the front portion extends radially outside a second reference arc defined by a second reference radius.

* * * * *

UNITED STATES PATENT AND TRADEMARK OFFICE
CERTIFICATE OF CORRECTION

| | | |
|---|---|---|
| PATENT NO. | : 9,133,888 B2 | Page 1 of 1 |
| APPLICATION NO. | : 14/241618 | |
| DATED | : September 15, 2015 | |
| INVENTOR(S) | : Anna Gremmelmaier et al. | |

It is certified that error appears in the above-identified patent and that said Letters Patent is hereby corrected as shown below:

In the claims:

Column 18, in line 27, replace "of the second tall" with -- of the second ball --.

Column 19, in line 17, replace "radius round a centre" with -- radius around a centre --.

Signed and Sealed this
Seventeenth Day of May, 2016

Michelle K. Lee
*Director of the United States Patent and Trademark Office*